United States Patent [19]

Rouverol et al.

[11] 4,324,441
[45] Apr. 13, 1982

[54] ROLLING CONTACT ELEMENT

[76] Inventors: William S. Rouverol, 1331 Arch St., Berkeley, Calif. 94708; Robert C. Krumme, 446 Forest Ave., Palo Alto, Calif. 94301

[21] Appl. No.: 200,373

[22] Filed: Oct. 24, 1980

[51] Int. Cl.³ .............................................. F16C 33/58
[52] U.S. Cl. .................................. 308/177; 308/216; 308/236; 308/DIG. 11
[58] Field of Search .......... 308/216, 207 A, DIG. 11, 308/236, 213, 197, 189 A, 163, 166, 237 R, 15, 207 R, 189 R, 177

[56] References Cited

U.S. PATENT DOCUMENTS

| | | | |
|---|---|---|---|
| 3,910,657 | 10/1975 | Dosne | 308/216 |
| 4,030,786 | 6/1977 | Schluter | 308/207 A |
| 4,089,570 | 5/1978 | Markfelder et al. | 308/216 |
| 4,141,606 | 2/1979 | Yamamura | 308/197 |
| 4,273,391 | 6/1981 | Asberg | 308/189 A |
| 4,289,360 | 9/1981 | Zirin | 308/236 |

Primary Examiner—Lenard A. Footland

[57] ABSTRACT

The invention discloses a means of increasing the maximum allowable load on mechanical elements that roll on each other, such as the members of constant or variable speed friction drives, ball or roller bearings, rollers, etc. The increased allowable load is achieved by constructing at least one of the elements that roll on each other in two parts, including a rolling-surface part that is heavily preloaded by one or more additional parts that induce large compressive stresses on the principal planes normal to the rolling-surface. Optimum materials for the rolling-surface part are those that have a large modulus of resilience, since these materials afford the maximum allowable load capacity. In addition to hardened steels, such materials include shape-memory materials, reinforced plastics, bronze and aluminum alloys, and chilled cast iron. Shape-memory materials in particular have the advantage of simplifying the supporting structure, especially when the rolling surface is convex.

26 Claims, 17 Drawing Figures

ROLLING CONTACT ELEMENT

BACKGROUND OF THE INVENTION

The load capacity of mechanical elements that roll on each other, such as those employed in tractive friction drives, ball and roller bearings, roll-followers for cams, etc., is governed by the maximum allowable contact pressure. In order to maximize this allowable surface pressure, these rolling contact elements have usually been made of the highest strength through-hardened or case-hardened steel. This is because allowable contact pressure is approximately a linear function of the "modulus of resilience", and no other material has heretofore been able to match the modulus of resilience of hardened steel.

The hardness of steel, however, especially when it is quenched and tempered, varies greatly with size. When a large steel item is quenched, the interior retains so much heat after the exterior has solidified that much of the hardness of the case is drawn before an equilibrium temperature is reached. As a result, while a small steel plate can be hardened to give a residual compressive stress in the case, parallel to the surface, of about 100,000 psi (703 MPa), the corresponding stress in a large piece of quenched steel is more of the order of 50,000 psi (352 MPa). The importance of this difference in residual stress with respect to allowable contact loads will be discussed below.

Accordingly, the object of the invention is to increase the allowable surface load on rolling contact elements. The means disclosed are particularly applicable to larger steel elements and elements made of materials that have limited Hertzian strength or hardenability.

The means to achieve these and other objects and advantages of the invention will be evident from the drawings as explained in the specification that follows.

Figure 1:
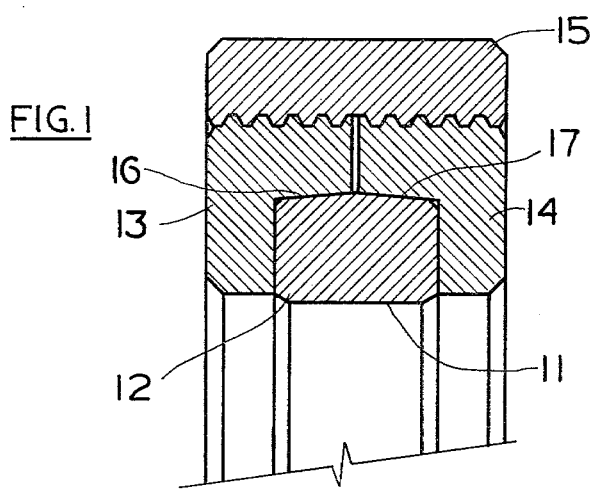
FIG. 1 shows a section through a large ring assembly embodying the invention. It is made up of four separate rings that fit together as prescribed below.

In detail and referring to FIG. 1, the ring assembly shown in section is made up of four separate rings that are all coaxial. The innermost surface 11 of ring 12 is the rolling surface. Ring 12 is squeezed between two L-section retaining rings 13, 14 that are drawn toward each other as a result of the angular turning of an exterior ring 15 that has right-hand threads engaged with one of the retaining rings 13, 14 and left-hand threads engaged with the other. The exterior surfaces 16, 17 of ring 12 are frustoconical and are engaged by similar surfaces on retaining rings 13 and 14 respectively. Since the free diameters of surfaces 16, 17 on the rolling surface ring 12 are greater than those of their mating surfaces on the retaining rings 13 and 14, there is an interference fit, and the drawing together of the retaining rings 13, 14 by angular turning of ring 15 induces radial and circumferential compression in ring 12. Additional tightening of the exterior ring 15, which may be assisted by such implements as spanner wrenches, hydraulic presses or jackscrews, will induce considerable axial compressive stress in the rolling surface ring 12 as well as the circumferential stress.

Figure 2:
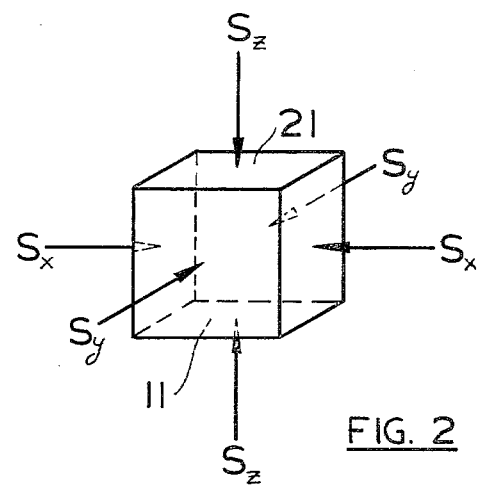
FIG. 2 shows an enlarged element of the annular rolling contact surface of FIG. 1, with principal stresses $S_x$, $S_y$ and $S_z$ acting on the principal planes.

If a roller (not shown) is pressed radially outward against rolling surface 11, additional stresses, called "Hertzian stresses", will be induced in the ring 12. There will then be stresses in all three orthogonal directions, and an element 21 in the rolling surface 11 at the line of contact with the roller will be loaded as shown, greatly enlarged, in FIG. 2. If the orientation of this element 21 is such that there are no shear forces on the x-, y- and z-planes, these planes are called "the principal planes", and the stresses $S_x$ (axial), $S_y$ (circumferential) and $S_z$ (radial) are called the "principal stresses".

For the purposes of the ensuing discussion, we will distinguish between two kinds of stresses in the x- and y-directions. If the ring 12 has been case-hardened on the rolling surface 11, the absorption of carbon (or nitrogen) into the microstructure during heat treating will induce what is usually called "residual stress". It consists of fairly large compressive stresses in the x- and y-directions and small tensile stresses in the z-direction. The residual compressive stresses decrease with radial distance into the ring 12 from the surface 11, while the residual tensile stress increases slightly. (The magnitude of residual stresses may be ascertained by known methods involving etching of the material surface.)

If ring 12 is not only case-hardened, as by case-carburizing, nitriding or shot peening, but is also assembled into a structure such as shown in FIG. 1, it will have not only "residual stresses" as a result of its case-hardening, but additional compressive stresses in the axial and circumferential directions induced by the preloading described above. These latter stresses will hereinafter be referred to as "prestresses".

The total stresses that act on the elements of ring 12 will be the sum of the "residual stresses", the "prestresses", and the Hertzian stresses, and these three systems of stresses are all superposable within the elastic range of the ring 12 material. The optimum magnitude of the prestresses that should be added to any previously ascertained system of residual stresses may be calculated with the aid of a graph of the Hertzian stresses such as that of FIG. 3. This graph shows the principal stresses $S_x$, $S_y$, and $S_z$ that act on elements located in an x-z normal to the surface of contact and located at various radial distances z into the rolling surface 11. Depths z into the surface 11 are measured by units based on b, the half-width of the contact band, which has a semi-elliptical stress distribution with a maximum surface stress $S_z$ of $q_o$ along its lengthwise central axis (i.e., in the x-direction). All of the stresses are expressed in terms of $q_o$. The magnitude of the half-width b of the contact band is given by the following equation:

$$b = q_o r_n C_E \quad (1)$$

where $r_n$ is the radius of relative curvature of the contact surface in the radial direction, and $C_E$ is an elastic constant that depends on the Poisson's ratios ($v_1$ and $v_2$) and Young's moduli ($E_1$ and $E_2$) of the materials of the ring 12 and roller that is pressed against it, respectively:

$$C_E = (1 - v_1^2)/E_1 + (1 - v_2^2)/E_2 \quad (2)$$

The maximum pressure $q_o$ at the center of the contact band is not, however, the critical stress with respect to either immediate yielding or fatigue failure. There is considerable evidence that indicates that the critical stress is what is called the "maximum-distortion-energy stress", or more briefly, the "effective stress" (hereinafter $S_{eff}$). Its magnitude (p. 5–53, Marks Standard Handbook for Mechanical Engineers is as follows:

$$S_{eff} = \sqrt{S_x^2 + S_y^2 + S_z^2 - S_x S_y - S_x S_z - S_y S_z} \quad (3)$$

Figure 3:
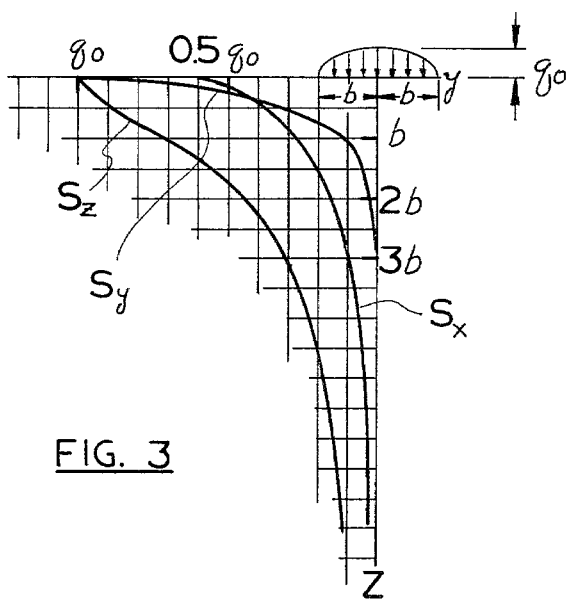
FIG. 3 shows a graph of the Hertzian stresses induced on these principal planes at the center of the contact area when a cylindrical or conical body is pressed outwardly against the ring assembly of FIG. 1.
Figure 5:
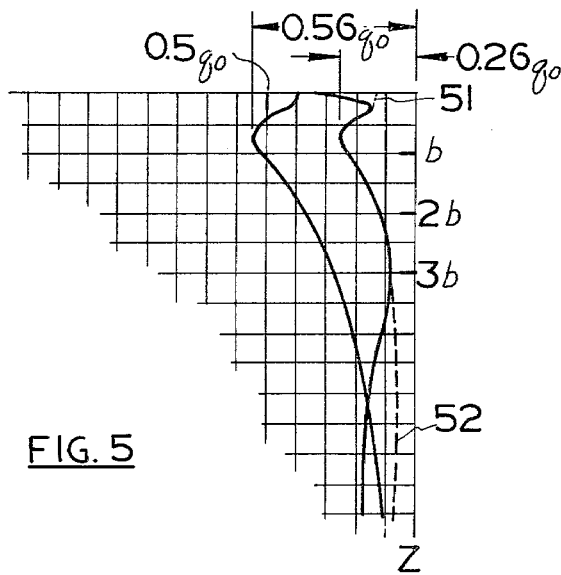
FIG. 5 shows a graph of the critical resultant stresses that act in the rolling surface element of FIG. 2 with ($S_{eff}''$) and without ($S_{eff}$) applications of the prestresses shown in FIG. 4.

According to the "maximum-distortion-energy" theory of failure, yielding (or fatigue failure, as the case may be) of ductile material will occur when the effective stress $S_{eff}$ equals the yield point stress in simple uni-axial tension (or endurance limit in equivalent cyclical loading, as the case may be). If the values of the principal stresses plotted in FIG. 3 are substituted in Eq. 3, it will be found that the effective stress reaches a maximum of about 0.56 $q_o$ at a depth of about 0.7 b. This is shown by the $S_{eff}$ curve in FIG. 5.

The advantages of the present invention can best be appreciated if Eq. 3 is written in the following form:

$$S_{eff} = \sqrt{\frac{(S_x - S_y)^2 + (S_y - S_z)^2 + (S_x - S_z)^2}{2}} \quad (4)$$

From this expression it can be seen that if the principal stresses $S_x$, $S_y$ and $S_z$ are equal or nearly so, the effective stress $S_{eff}$ will be extremely small and a very large value of $q_o$ may be utilized without exceeding the yield point stress (or endurance limit, as the case may be). From an examination of the curves of FIG. 3 it is evident that if additional compressive stresses $S_x'$ of about 0.5 $q_o$ and $S_y'$ of about 0.6 $q_o$ are added to the principal stress values $S_x$ and $S_y$ respectively, at a depth of 0.7 b, the principal stress difference terms in Eq. 4 will approach zero and $S_{eff}$ will be extremely small. However, unless part or all of $S_x'$ and $S_y'$ are produced by local bending produced by the roller that loads the ring of FIG. 1, the value of $S_{eff}$ at points that are not subjected to any normal load $S_z$ may be larger than the yield point stress. For this reason, the most useful range for $S_x'$ and $S_y'$ is about 0.3 $q_o$. Prestresses of this magnitude are shown by the solid line in FIG. 4.

Figure 4:
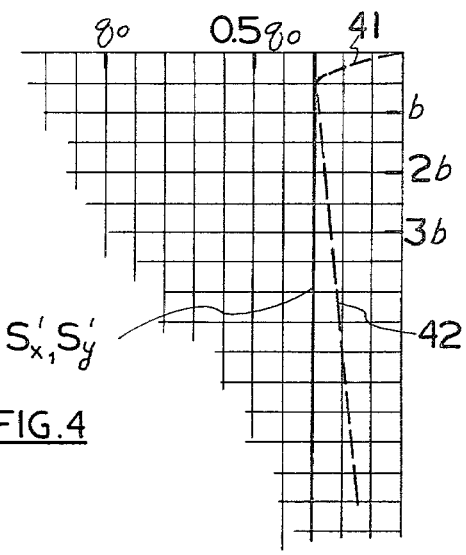
FIG. 4 shows a graph of one pattern of compressive prestresses that may be applied to the rolling surface element of the ring assembly of FIG. 1.

If the material of the rolling surface 11 is subjected to prestresses $S_x'$ and $S_y'$ then Eq. 4 becomes:

$$S_{eff}'' = \sqrt{\frac{(S_x + S_x' - S_y - S_y')^2 + (S_y + S_y' - S_z)^2 (S_x + S_x' - S_z)^2}{2}} \quad (5)$$

where $S_x$, $S_y$ and $S_z$ are as shown in FIG. 3 and $S_x'$ and $S_y'$ are any desired prestresses, such as those shown in FIG. 4. At points removed from the contact area, $S_x$, $S_y$ and $S_z$ will be zero, and if $S_x'$ and $S_y'$ are both 0.3 $q_o$, Eq. 4 gives for $S_{eff}$ a value of 0.3 $q_o$. With the same $S_x'$ and $S_y'$ prestresses added to $S_x$ and $S_y$ the maximum effective stress $S_{eff}''$ in the Hertzian zone at a depth of about 0.7 b, is approximately 0.26 $q_o$. In other words, the prestresses have reduced the critical subsurface stress $(S_{eff}'')$max to about 47% of its value (0.56 $q_o$) when no prestresses are present. This reduced subsurface stress is also less than the maximum effective stress of 0.3 $q_o$ produced by the prestresses acting alone. The effect of using such large prestresses is that so far as yielding of the surface material is concerned, it is the prestress at points other than the contact area that is critical and not the actual Hertzian stresses in the contact area. Despite this fact, however, maximizing the allowable load requires that the prestresses in both the x- and y- directions be as close as possible to the yield point stress in simple tension.

Since the maximum contact load depends not only on the maximum allowable contact pressure $q_o$ but also on the size of the contact area, which also varies directly with $q_o$ as shown by Eq. 1, the maximum contact load is a function of the quantity $q_o^2 C_E$. This is why the "modulus of resilience" of a material (defined as $S_{yp}^2/2E$) is, as noted above, a convenient index of the allowable contact load. Some materials having a large modulus of resilience include, in addition to hardened steel, glass reinforced plastics, aluminum and bronze alloys, chilled cast iron, and "shape memory" materials (see below).

In view of the dependence of allowable contact load on the square of the maximum Hertzian pressure, it will be evident that reducing the effective stress by the ratio 0.26/0.56, which we have indicated can be done by applying suitable prestresses, increases the load capacity of the contact by the factor 0.56/0.26 squared, or approximately 4.5 times. The increase in Hertzian pressure also produces, at least for steel on steel, a slightly increased coefficient of tractive friction, when the slip rate is small and the contact area relatively large. As a result of this increase, together with the increased normal load, the theoretical torque capacity for a tractive friction drive in which the tractive elements are made of through-hardened steel and are prestressed according to the present invention, is increased approximately 5-fold. It should be noted, however, that to achieve this magnitude of torque increase, it is necessary to make two minor corrections in the circumferential prestress $S_y'$. The effects of these corrections are shown in FIG. 4 by broken line segments 41, 42. One of these segments (41) results from grinding the rolling surface 11 in the circumferential direction; the other (42) is from utilizing a prestress in the y-direction that is not entirely induced by the radial interference fit but is in part a bending stress produced by the concentrated roller load on the ring assembly of FIG. 1. The effects on $S_{eff}''$ of these corrections on the $S_y'$ prestress are shown by the dotted segments 51 and 52 in FIG. 5.

It should be noted that an alternative way to produce an optimum effective stress curve $S_{eff}''$ (FIG. 5), if ring 12 is made of steel, is to case-carburize the rolling surface 11, since case-carburizing with a finish grind produces a residual stress pattern that is essentially similar to the $S_y'$ curve 41–42 in FIG. 4. Since the residual stresses are directly additive to the prestresses, case-hardening simply reduces somewhat the magnitude of the interference that must be designed into surfaces 16 and 17 of FIG. 1.

To this point the nature of the invention has been described as it would be applied to a ring such as used in a "ring roller" adjustable speed traction drive (see "1979 Mechanical Drives Reference Issue", June 28, 1979, p. 11, or "1980 Mechanical Drives Reference Issue", June 19, 1980, p. 13, of Machine Design, hereinafter referred to as "Ref. 1"). The FIG. 1 type of ring may also be used in such devices as a nutating type of ring-roller adjustable speed traction drive (Popular Science, March 1980, pp. 83–86), a constant speed planetary friction drive (ibid, p. 84), or outer races of antifriction bearings.

Figure 6:
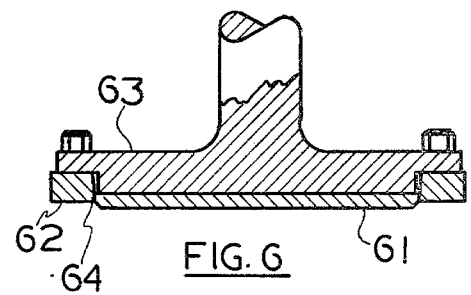
FIG. 6 shows a centerline section through a disk member that has a flat rolling contact surface rather than the annular-cylindrical surface illustrated in FIG. 1.

It will be apparent that the invention is applicable to many other types of rolling contact machine elements employed in other forms of adjustable speed traction drives, ball and roller bearings, cam rollers, and the like. A number of such applications are shown in FIGS. 6 to 17. Specifically, FIG. 6 shows in section an application of the invention to the input or output disc of a "ball disc" drive (Ref. 1 and U.S. Pat. No. 2,951,384). In this embodiment the disc assembly is composed of three parts, including a round rolling surface plate 61, a retaining ring 62, and a mounting hub 63. The rolling surface plate 61 has a frusto-conical edge that mates with a corresponding frusto-conical surface 64 on the inner periphery of the retaining ring 62. As the plate 61 is pressed into the retaining ring 62 by mounting hub 63, interference develops between the plate 61 and the ring 62 and produces a compressive prestress in plate 61 that is uniform over the entire plate in both x- and y-directions and adds to any residual stresses the plate 61 may have if it is case-hardened.

When a spherical ball (not shown) is pressed against the prestressed surface, a Hertzian stress distribution somewhat similar to that of FIG. 3 is developed and superimposed on the prestress pattern. Like the $S_{eff}''$ curve of FIG. 5, the effective stress produced in plate 61 by the spherical contact load is much lower than if there is no prestressing of the plate 61, so the allowable load on the spherical balls can be increased 4- or 5-fold without producing yielding or fatigue failure of the plate 61.

Figure 7:
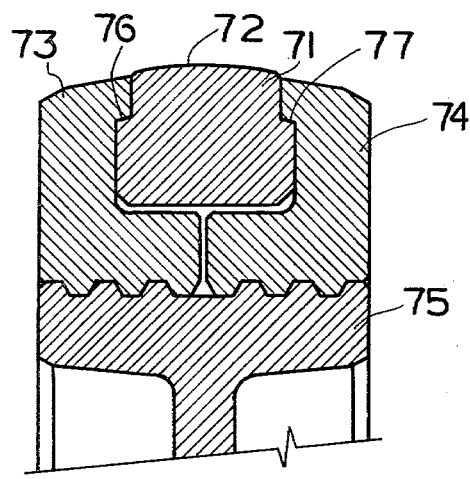
FIG. 7 shows a section through the rim of a roller that embodies the invention. The construction is similar to that of the ring assembly of FIG. 1 except that the rolling contact surface is on the convex exterior rather than the concave interior.

FIG. 7 shows in section an adaptation of the invention to a convex rolling element, such as might be employed in a "toroidal drive" (Ref. 1), in a cam roller, or in the sun or planet rollers of a planetary friction gear (Popular Science, op. cit.). In this configuration a rolling surface ring 71, having a spherical, cylindrical or crowned-cylindrical surface 72, is subjected to circumferential and axial compression by pressure exerted by a pair of J-section rings 73, 74. Rings 73, 74 are drawn toward each other by turning of a threaded hub 75 having right-hand threads that engage one of the J-section rings 73, 74 and left-hand threads that engage the other. Frusto-conical surfaces 76, 77 on ring 72 have an interference fit with mating surfaces on the J-section rings 73, 74 respectively, so that tightening up of the assembly induces compressive prestresses in the rolling surface 72. Generally the same observations with regard to residual stresses and load capacity increases made with respect to the construction of FIGS. 1 and 6 apply to this configuration as well.

Figure 8:
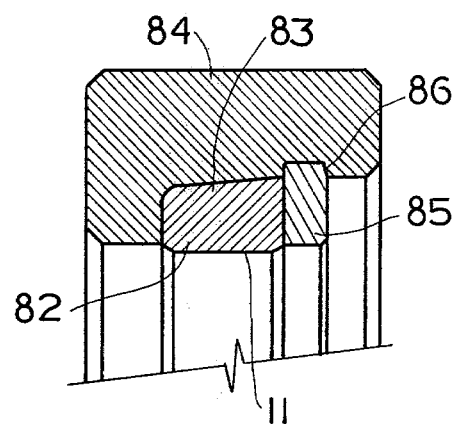
FIG. 8 shows a section through a ring assembly similar to that of FIG. 1 but with a modified construction.

FIG. 8 shows in section a modification of the ring assembly of FIG. 1. In this configuration the rolling surface 82 has an outer periphery 83 that is frusto-conical and mates with a corresponding frusto-conical surface on an exterior ring 84. Because there is an interference fit between the rolling surface ring 82 and the exterior ring 84, the seating of ring 82 in ring 84 induces circumferential prestress in ring 82. In addition, axial prestress is induced in ring 82 by installation of a retaining ring 85 that bears against a frusto-conical surface 86 in exterior ring 84. There are a number of known kinds of retaining rings that may be used as part number 85, generally involving split rings with spring ("snap ring") or jack screw loading.

An alternative to hardened steel for various of the elements of FIGS. 1, 6, 7, and 8, and especially FIGS. 9 to 17, is a class of materials called "shape-memory" materials, primarily because they are particularly well suited to shrink-fit assemblies. Shape-memory alloys are described in various technical articles such as that in "Mechanical Engineering", March 1980, pp. 42, 43. In general, the shape-memory materials that are useful for the kinds of applications herein disclosed are those that have a critical temperature below the operating temperatures to which power transmission equipment is ordinarily exposed. The nickel-rich variant of nickel-titanium alloy is an example of such a material.

Because of the large dimension changes as they are heated through the critical temperature, shape-memory materials are useful in the present invention both for rolling surfaces and prestressing elements. In the case of rolling surfaces, the prestressing techniques herein described overcome the disadvantage that nickel-titanium is not hardenable, allowing greatly increased Hertzian pressures which combine with a low Young's modulus to give a modulus of resilience comparable to that of hardened steel. Torque capacities as great as those of prestressed hardened steel are therefore obtainable, and often the details of construction are much simpler, as will be shown in connection with FIGS. 9–17 below. (It should be noted that U.S. Ser. Nos. 787,107 and 949,069 disclose the use of shape-memory materials for the running surface on rail wheels. However, the material from which rails are made must be inexpensive, so low strength steel is used, and there is no significant advantage to be gained by giving the wheels substantially greater Hertzian load capacity than the rails. Consequently the wheel-and-rail application is inherently a low load application as compared to the high load applications described herein. In keeping with this difference in purpose, the above mentioned prior art patents disclose applications in which the shape-memory material is shrunk onto the wheel rim exterior and is therefore in circumferential tension. This is not a disadvantage if the Hertzian loads are low, but if the loads are high, the rolling surface must be mounted so as to have circumferential compression, as in the various embodiments of the present invention and for the purposes indicated.)

Figure 9:
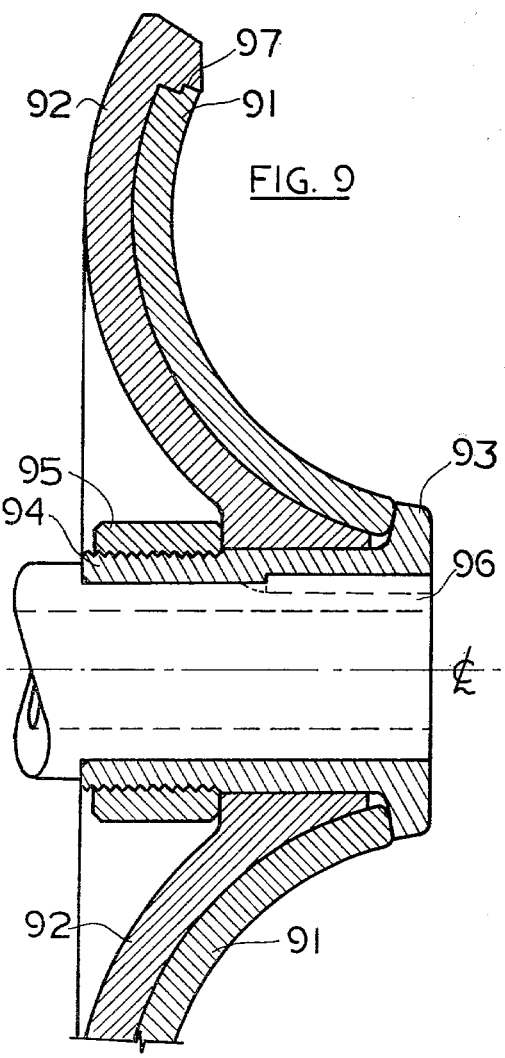
FIGS. 9 through 17 show sections through various other machine elements having concave, flat or convex rolling surfaces that embody the invention.

FIG. 9 shows a section of a toroidal disc for a low-spin adjustable speed drive (c.f., Power Transmission Design, May 1980, pp. 36–39). In this configuration the rolling surface 91 is compressed against a backing member 92 by a shoulder 93 on a sleeve member 94. The latter is drawn toward the backing member 92 by the turning of a threaded collar or nut 95, and the entire assembly is keyed onto a shaft 96. To reduce the clearance required for assembly of rolling surface 91 into backing member 92, the interface between these two members at the periphery of the rolling surface 91 may be provided with one or more small stepped frusto-conical surfaces 97 normal to the working surface of member 91. Any material with a large modulus of resilience, including those discussed above, is suitable for use in the rolling surface 91, although the use of a metallic material not possessing shape-memory properties would require the use of several steps 97 if the outer diameter of the rolling surface element 91 is significantly larger than the central diameter of the torus.

Figure 10:
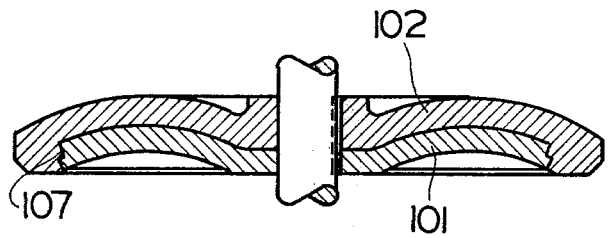
Figure 11:
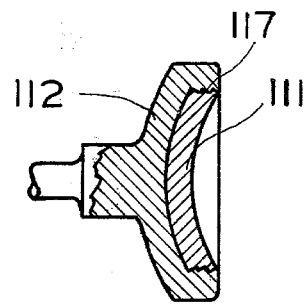
Figure 12:
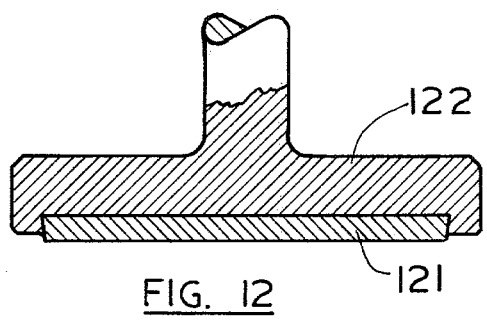

FIG. 10 shows a sectional view of another tractive friction disc similar to that of FIG. 9, but for a conventional "toroidal drive" (Ref. 1) rather than the low-spin variant. Similarly, FIGS. 11 and 12 show in section the construction of friction discs for a "spool" drive (Ref. 1) and a "ball disc" drive (Ref. 1) respectively.

A number of observations may be made with respect to the embodiments of FIGS. 9 to 12, as follows: (1) If the rolling surface element (91, 101, 111, 191) is flat (FIG. 12) or concave (FIGS. 9, 10 and 11), it does not need to be bonded to its backing element (92, 102, 112, 122); (2) If the body that frictionally engages the rolling surface has a relatively small diameter, as in the case of the spherical balls used with the disc of FIG. 12, the rolling surface element (121) may be fairly thin; if not, thicker rolling surfaces (91, 101, 111) must be used, as indicated by Eq. 1; most of these thicker surfaces may require stepped edges (97, 102, 117), depending on the amount of expansion (or contraction) afforded by the shrink fit employed to produce the compressive prestress; (3) In all the embodiments the larger dimension changes afforded by shape-memory materials (typically 5 to 8% as the material passes through its critical temperature range) allows for reduce manufacturing tolerances and closer control of prestresses as compared to those of conventional shrink fits; (4) Shape-memory materials may be used for either the rolling surface element (91, 101, 111, 121) or the backing element (92, 102, 112, 122), depending on whether the compressive prestresses is to be produced by its expansion or its shrinkage, which in turn depends on whether it has been compressed or enlarged in its martensitic state.

Figure 13:
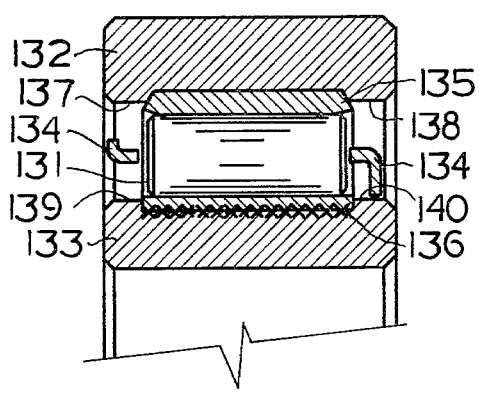
Figure 14:
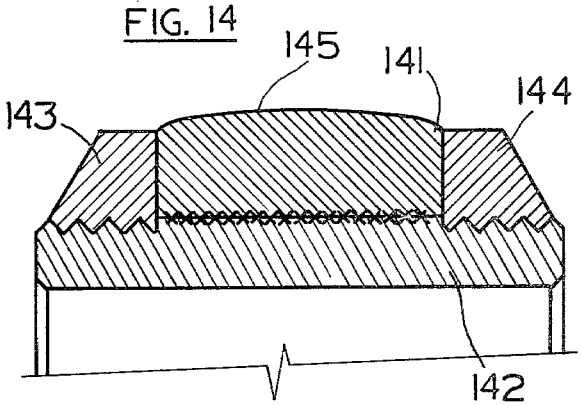
Figure 15:
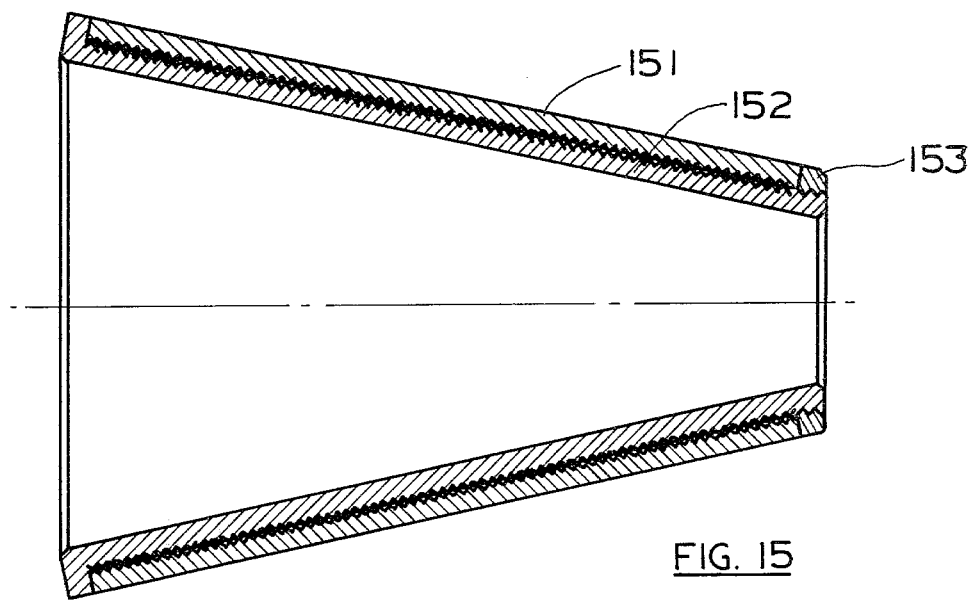
Figure 16:
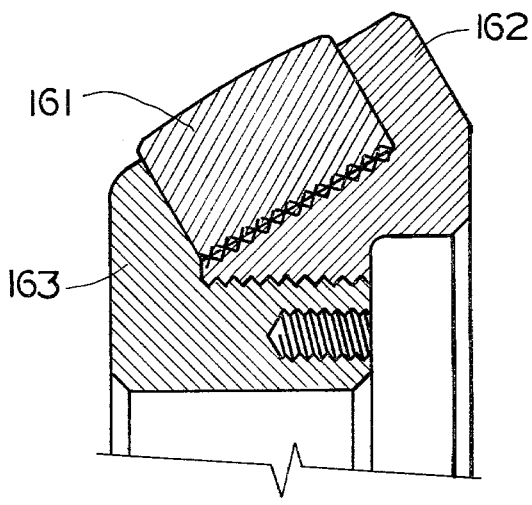

FIG. 13 shows a section through a cylindrical roller bearing that embodies the invention. Because the races 132, 133 have relatively large diameters relative to that of the rollers 131, shape-memory materials that exhibit a 7 or 8% diameter change when heated through the critical temperature are useable for either the rolling surface elements 135, 136 or the backing rings 132, 133. This is because the required thickness of the rolling surfaces 135, 136, as a percentage of the radius of relative curvature ($r_n$ in Eq. 1), is smaller than 7 or 8% of the race diameters, and the shoulders 137, 138, 139, 140 that apply axial prestress may be integral with the backing rings 132, 133. This greatly simplifies the construction. (In the section shown, item 134 is the case or separator that aligns and spaces the rollers 131.)

It will be noted in FIG. 13 that on the inner race, the interface between the rolling surface 136 and the backing ring 133 is shown as having a series of x's along its entire axial length. These x's are intended to indicate that the adjacent parts are bonded together on this surface, so that expansion of the rolling surface 136 (or contraction of the backing ring 133, as the case may be) will develop radially-directed tensile forces on the interface that induce circumferential compression in the rolling surface 136. This kind of bonded surface is recommended in all embodiments of the invention in which the rolling surface is convex and has too great an axial length to allow the use of shoulders as in FIG. 7 (76, 77).

The radial tensile forces that act on the interface are not very great, being simply the circumferential compressive prestresses divided by the radius-to-thickness ratio of the rolling surface 136. When this ratio is large, as in a light roller bearing, it is possible to use silver or other high strength solders to effect the bonding. For lower ratios, fusion welding as by multiple spot or seam welding or chill casting is preferred The installation of the rolling suface 136 requires three steps: (1) sealing the rolling surface 136 in its groove by cooling to its martensitic temperature range whichever member is made of shape-memory material (136 or 133), expanding it plastically (or compressing it, as the case may be) with the aid of a suitable arbor or die until the difference in diameters is large enough so the rolling surface element 136 can be slipped over one of the shoulders (139 or 140), and finally allowing the temperature of the two elements to rise through the critical temperature; (2) bonding the interface by whatever process is appropriate; and (3) cooling the bonded pair of elements (136, 133) back down to the martensitic temperature range of the shape memory material, compressing (or, as the case may be, expanding) the bonded pair 136,133, and, finally, allowing the temperature of the bonded pair 136, 133 to rise again through the critical temperature in order to induce circumferential and, if the shoulders 139, 140 are snug enough, axial compressive prestresses in the rolling surface 136.

FIGS. 14 to 17 show sections of other convex rolling body shapes in which the invention may be applied. All of them are shown as employing a bonded interface to induce bi-axial compressive stresses in bodies substantially wider than the rolling surface ring 71 of FIG. 7. In all of these applications either the rolling surface element (141, 151, 161, 171) or the backing element (142, 152, 162, 172) may be made of shape-memory material. In the case of the embodiments of FIGS. 14, 15 and 16 at least one threaded shoulder is used (143, 144, 153, 163), so that thicker rolling surface elements (141, 151, 161) can be utilized. The presence of these shoulders allows the first of the three steps employed to assemble the inner race (136, 133) of the bearing of FIG. 13 to be omitted. Otherwise, the prestressing is accomplished in the same manner.

Some of the applications for which these various convex embodiments are adapted are as follows: (a) FIG. 14, same as FIGS. 7 and 8 (inner race); (b) FIG. 15, all frusto-conical surfaces such as those employed in ring roller, Beier disc and roller variator traction drives (Ref. 1); nutating ring roller drives (Popular Science op. cit.), tapered roller bearing inner races and rollers, etc; and (c) FIG. 16, low-spin toroidal friction drives (Power Transmission Design, op. cit.) offset sphere, free ball, ball variator, roller variator and spool drive rollers (Ref. 1). (Webs, hubs or shafts that may be employed with the embodiments of FIGS. 14, 15 and 16 have been omitted in the interest of simplification.)

Figure 17:
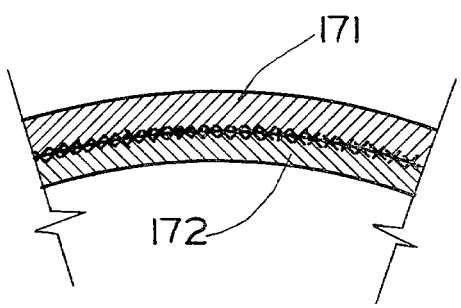

FIG. 17 shows a partial section of a hollow spherical body embodying the invention, such as might be employed for the ball elements of ball bearings for ball variator, free ball or ball disc traction drives (Ref. 1). Fabrication of a hollow ball of this type may be accomplished by depositing the rolling surface 171 on a hollow backing member 172, as by vapor deposition or electrolytic deposition. Flexure of a spherical shell under load produces substantial compressive prestresses at the points of loading, so the amount of prestressing by radial tension at the interface is reduced. If the spherical surface is continuous and a shape memory material is employed, it should be the outer part 171, since no significant mechanical expansion in the martensitic state is possible.

It may be noted that the dies used to produce plastic flow in a shape memory part or one that combines a shape memory layer with a steel or other bonded layer may be designed to produce almost any desired amount and direction of plastic flow, provided the body being expanded or compressed is allowed one direction in which it may flow plastically. Use of a radially expandible collet is mentioned in the prior art (U.S. Ser. No. 787,107), but it is also possible to expand a ring-shaped or frusto-conical part by pushing it over a tapered mandrel, or to contract it by forcing it into a conically tapered sleeve (see FIGS. 6 and 8). A hollow spherical shell may be made smaller by pressing it between a pair, or a series of pairs, of slightly smaller hemispherical dies.

The range of allowable Hertzian pressures attainable by the methods detailed in this specification depend on many factors, but under optimum conditions may be more than double the pressures allowable without prestressing. As noted above, this increases the theoretical torque capacity of tractive friction drives having hardened steel friction surfaces by approximately five times; torque capacities obtained when the rolling surfaces use materials having low Young's moduli, such as nickel-titanium alloy, are roughly comparable. Bearing ratings are similarly increased. To obtain these maximum capacities requires that the combined residual and prestress magnitudes be as large as possible. In extreme cases, where there is little or no case-hardening, the compressive prestress may be applied in both the x- and y-direction and be half to three-fourths or more of the yield point stress in simple tension. At the other extreme, if there is considerable residual stress, the prestress may be applied in only one direction (usually circumferential) and have a magnitude of as little as one-fourth to one-half the yield point stress in simple tension.

A number of observations may be made with respect to the drawings: (a) In several of the figures parts are held together only by friction; if desired the friction forces may be supplemented by staking the parts together, to prevent relative rotation of other movement, as for example by roll pins. (b) In addition to the use of shoulders (FIG. 7) or bonded surfaces (FIGS. 13 to 17), convex rolling surfaces may be put into circumferential compression by making them in the form of a close-wound rectangular-section helical spring, then expanding the spring diameter by unwinding until it may be slipped over a mandrel; this method of producing compressive prestresses on the rolling surface has the disadvantage, however, of producing high effective stresses at the interface between the helical spring interior surface and the mandrel. (c) If it is desired to maintain the prestresses at a fairly constant value in equipment exposed to wide temperature variations, the materials used for the rolling surface and the backing part must have similar coefficients of thermal expansion.

In the ensuing claims the above described constructions are differentiated from case-hardened one-piece rolling surface bodies by specifying two separate "parts", comprising (1) a rolling surface and (2) a backing element that preloads the rolling surface part. The fact that these two parts may be bonded together by fusion welding, or in some cases by casting one against the other so one functions as a mold chill, should not be construed as negating the fact that the assembled body is made up of two "parts".

We claim:

1. A pair of bodies, one of which is mounted to roll on the other,
    one of said pair being composed of at least two parts, including a first part that has a surface in rolling contact with the other of said pair and at least one additional part that applies to said first part forces that induce at the point of contact of said bodies compressive stress on a first plane normal to said surface at said point,
    said compressive stress being greater than one-fourth the yield point stress in simple tension for the material of said first part.

2. A pair of bodies according to claim 1 wherein said compressive stress is greater than one-half said yield point stress.

3. A pair of bodies according to claim 1 wherein said compressive stress is greater than three-fourths of said yield point stress.

4. A pair of bodies according to claim 1 wherein said first plane is normal also to the plane of maximum relative curvature of said bodies at said point.

5. A pair of bodies according to claim 1 wherein a said additional part applies to said first part forces that induce at said point additional compressive stresses on a second plane normal to said surface and normal also to said first plane.

6. A pair of bodies according to claim 5 wherein said compressive stresses on said first and second planes are both greater than one-half said yield point stress.

7. A pair of bodies according to claim 5 wherein said compressive stresses on said first and second planes are both greater than three-quarters of said yield point stress.

8. A pair of bodies according to claim 5 wherein said compressive stresses on said first and second planes are induced by forces applied by a common additional part.

9. A pair of bodies according to claim 1 wherein said first part is ring-shaped.

10. A pair of bodies according to claim 9 wherein said additional part has a frusto-conical surface that bears against said first part and is also ring-shaped.

11. A pair of bodies according to claim 10 wherein said frusto-conical surface is proportioned to produce an interference fit between said first part and said additional part.

12. A pair of bodies according to claim 1 wherein said forces applied by said additional part are produced by threaded means.

13. A pair of bodies according to claim 1 wherein said surface is flat.

14. A pair of bodies according to claim 1 wherein said surface is concave.

15. A pair of bodies according to claim 1 wherein said surface includes a spherical portion.

16. A pair of bodies according to claim 1 wherein said surface includes a frusto-conical portion.

17. A pair of bodies according to claim 1 wherein said surface includes a toroidal portion.

18. A pair of bodies according to claim 1 wherein said surface is convex and said compressive stresses on said planes are produced by forces exerted by said additional part against a frusto-conical surface of said first part.

19. A pair of bodies according to claim 1 wherein a portion of said compressive stress on said first plane is produced by flexing of said first part.

20. A pair of bodies according to claim 1 wherein one of said parts is made of a shape-memory material.

21. A pair of bodies according to claim 1 wherein one of said parts is made of an alloy of which the principal constituents are nickel and titanium.

22. A pair of bodies according to claim 1 wherein said first part is case-hardened.

23. A pair of bodies according to claim 1 wherein said first surface is convex and said first part also has an annular surface that is bonded to said additional part.

24. A pair of bodies according to claim 1 wherein said additional part applies said forces upon said first part by means of an interference fit.

25. A pair of bodies according to claim 1 wherein said additional part is made of a shape-memory material bonded to said first part on the side of said first part opposite to said surface.

26. A pair of bodies according to claim 1 wherein one of said parts is built up upon the other by deposition.

* * * * *